US010846759B2

(12) United States Patent
Olson et al.

(10) Patent No.: US 10,846,759 B2
(45) Date of Patent: Nov. 24, 2020

(54) WEB ENHANCEMENT FOR MULTIMEDIA CONTENT PROVIDERS

(71) Applicants: Kelsey Irene Olson, Santa Cruz, CA (US); Michael Keith Olson, Santa Cruz, CA (US); Marlene Dolores Olson, Santa Cruz, CA (US)

(72) Inventors: Kelsey Irene Olson, Santa Cruz, CA (US); Michael Keith Olson, Santa Cruz, CA (US); Marlene Dolores Olson, Santa Cruz, CA (US)

(*) Notice: Subject to any disclaimer, the term of this patent is extended or adjusted under 35 U.S.C. 154(b) by 573 days.

(21) Appl. No.: 14/814,369

(22) Filed: Jul. 30, 2015

(65) Prior Publication Data

US 2016/0055547 A1    Feb. 25, 2016

Related U.S. Application Data

(60) Provisional application No. 62/039,480, filed on Aug. 20, 2014.

(51) Int. Cl.
    *G06Q 30/02*    (2012.01)
(52) U.S. Cl.
    CPC ............... *G06Q 30/0277* (2013.01)

(58) Field of Classification Search
    USPC .................. 725/13; 705/14.46, 14.14
    See application file for complete search history.

(56) References Cited

U.S. PATENT DOCUMENTS

| | | | | |
|---|---|---|---|---|
| 2004/0103032 A1* | 5/2004 | Maggio | ............... | G06Q 30/02 705/14.2 |
| 2007/0286169 A1* | 12/2007 | Roman | ............... | H04L 12/66 370/352 |
| 2008/0109306 A1* | 5/2008 | Maigret | ............... | G06F 21/10 705/14.46 |
| 2008/0147487 A1* | 6/2008 | Hirshberg | ............... | 705/14 |
| 2010/0138852 A1* | 6/2010 | Hirsch | ............... | G06Q 30/02 725/13 |

* cited by examiner

*Primary Examiner* — Afaf Osman Bilal Ahmed
(74) *Attorney, Agent, or Firm* — Donald R. Boys; Central Coast Patent Agency LLC

(57) ABSTRACT

A Query/Response service provides Queries to Media Providers, the Queries to be displayed or played in media broadcast, and interactive Banners to be presented in web sites or other Internet destinations hosted by the Media providers. Audience members react to the Queries to visit the Media Provider's web destinations to respond to the Queries. The system motivates increased traffic to Media Provider's destinations.

20 Claims, 6 Drawing Sheets

501

1. KPIG Radio 107.5 Freedom, CA
2. KARP Radio 106.9 Cincinatti, OH
3. KION TV Salinas
4. KSCO Radio 1080 Santa Cruz, CA
5. KGO Radio 810 San Francisco, CA
6. Walgreens.com
7. Wholefoods.com
8. KaiserPermanente.com
9. Acme Marketing Company, Inc.
10. Royal Dutch Shell Company
11. IBM, Incorporated
12. ...
13. ...
etc. ...

WEB ENHANCEMENT FOR MULTIMEDIA CONTENT PROVIDERS

CROSS-REFERENCE TO RELATED APPLICATIONS

The present invention claims priority to Provisional Patent Application 62/039,480, filed Aug. 20, 2014. All disclosure of the provisional application is incorporated at least by reference.

BACKGROUND OF THE INVENTION

1. Field of the Invention

The present invention is in the technical field of broadcast media provision and website coordination, and pertains more particularly to a system for increasing traffic to websites and other Internet destinations for multimedia content providers.

2. Description of Related Art

Media content providers, including radio and television broadcasters, find it difficult to induce regular audiences of their radio and television broadcasts to become regular users of their respective hosted websites. One reason for this difficulty is that there is a significant investment required to provide websites with fresh, topical content sufficient to attract and hold an audience. Further, there has been, until the present invention, no efficient and workable method for inducing audience members following media broadcasts, to navigate to the content providers' websites and other destinations. There is therefore a clear need for a system to associate broadcast media and websites in a way that motivates audiences to frequent their websites.

BRIEF SUMMARY OF THE INVENTION

IN one embodiment of the invention a a Query/Response service is provided, comprising one or more Internet-connected computerized Servers at a Service site executing software (SW) from a non-transitory medium, a data repository coupled to the one or more Internet-connected Servers, information concerning a plurality of Media Provider entities providing media to voluntary audience members, the information including an Internet destination for delivery of digital information to each Affiliate and a destination address for a web presence associated with and hosted by each Affiliate, a first facility provided by the SW creating Queries as media appropriate to Media Provider's sites, and associating created Queries with individual ones of the Media Providers, each Query presenting a challenge as a question, followed by a Tag indicating the destination for the Affiliate's web presence where an audience member may respond to the Query challenge, a second facility provided by the SW creating Banners as HTML files, the Banners associated with specific Queries and presenting the associated Queries, along with an interactive link configured to redirect an Audience member activating the link to the one or more Internet-connected Servers at the Service site, and a third facility provided by the SW connecting the Audience members activating the links to interactive interfaces configured to accept Query responses from the Audience members connected. Queries and associated Banners are associated one-on-one at the Service with specific ones of the Media Provider Affiliates, and are provided periodically to the associated Affiliates where the Queries are inserted into programming, Banners associated with the Queries are provided to the Media Provider's web presence, where they are inserted, and responses are accepted from Audience members connected by redirect from links in the Banners, such that audience members of Media Provider Affiliates are motivated to visit the web presences of the Media Provider Affiliates, increasing traffic to those sites.

In one embodiment an advertisement is included in the Query before or after the Query challenge. Also in one embodiment advertisements are drawn from Internet-connected sources, and are selected according to Affiliate's profile information, including preferences. Also in one embodiment advertisements are selected considering known information regarding audience demographics. Also in one embodiment a leading and a trailing advertisement are presented in the Query.

In one embodiment of the service one or more advertisements are also presented in the Banner sent to the Affiliate's website. Also in one embodiment audience responses received are recorded in the data repository associated with Queries, Banners and Affiliates. Also in one embodiment responses to Queries are tallied for periods between sending the Queries, and the system makes Responses available to interested parties. In one embodiment he interactive interfaces in the third facility promotes information from Audience members in addition to a response to the query. And in one embodiment the information additional to the Query response from Audience members includes one or both of demographic and geographic information, and the additional information is used by the system to further process responses for interested parties.

In an alternative aspect of the invention a Query/Response method is provided, comprising creating at a Server executing software at a Query/Response service Queries as audio or audio and video files, each Query presenting a challenge as a question followed by a tag indicating a URL for an affiliated Media Provider's website where an audience member may respond to the Query challenge, associating the created Queries with individual ones of the affiliated Media Providers, the Media Providers broadcasting audio only or audio and video broadcast to voluntary audience members, creating a Banner associated with each Query, the Banners being HTML files presenting the Query Challenge and also exhibiting a link to the Query/Response Server, periodically sending created Queries to the affiliated Media Providers, and sending the Banners associated with the Queries to the URL of the Affiliate's website, where the Banners are inserted in a page at the website, connecting Audience members activating the link in the Banners to an interactive interface at the Server, enabling the Audience members to answer the challenge in the Query and Banner, and recording the responses from Audience members in the data repository.

In one embodiment of the method an advertisement is included in the Query before or after the Query challenge. Also in one embodiment advertisements are drawn from Internet-connected sources, and are selected according to Affiliate's profile information, including preferences. Also in one embodiment advertisements are selected considering known information regarding audience demographics. And in one embodiment a leading and a trailing advertisement are presented in the Query.

IN one embodiment of the method one or more advertisements are also presented in the Banner sent to the Affiliate's website. Also in one embodiment audience responses received are recorded in the data repository associated with Queries, Banners and Affiliates. Ii one embodiment responses to Queries are tallied for periods between sending the Queries, and the system makes results of responses available to interested parties. IN one embodiment the interactive interfaces in the third facility markets information from responders in addition to a response to the Query. And in one embodiment the information additional to the Query response from responders includes one or both of demographic and geographic information, and the additional information is used by the system to further process responses for marketing to interested parties.

DETAILED DESCRIPTION OF THE INVENTION

Figure 1:
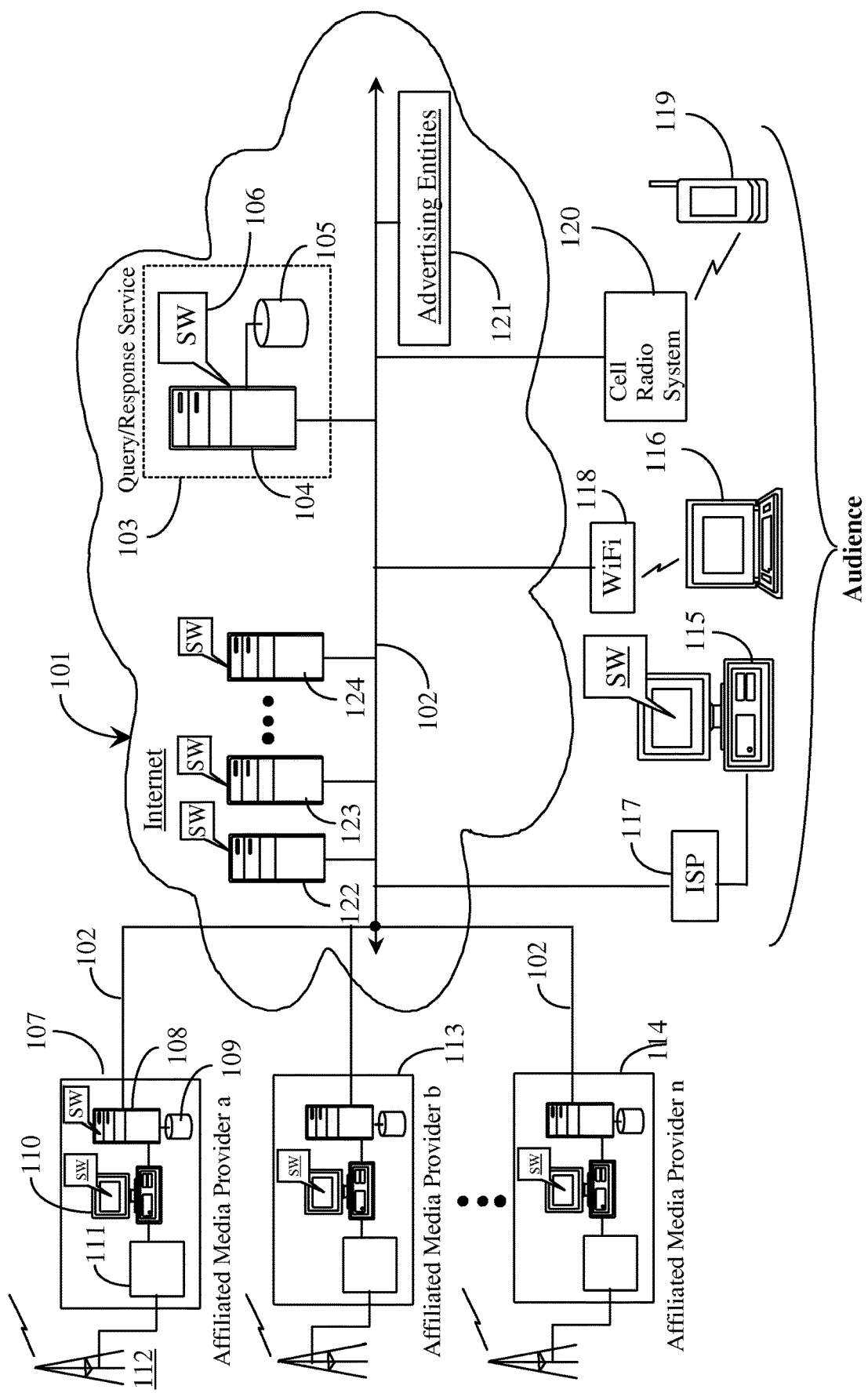
FIG. 1 is an architectural diagram of a system in an embodiment of the invention.

FIG. 1 is an architectural diagram depicting a system in one embodiment of the invention. In the system illustrated in FIG. 1 a Query/Response Service 103, comprising at least one computerized Server 104 executing software 106 from a non-transitory medium, and a coupled data repository 105 is shown connected to backbone 102 of an Internet Network 101. Backbone 102 is meant to represent all of the connections available and all of the sub-networks in the Internet.

In the embodiment of FIG. 1 a plurality of affiliated Media Providers 107, 113 and 114 (a through n) are shown, representing a substantial number of such broadcasters without a specific limit. The broadcasters are referred to in this specification as media content providers, and may include radio and television broadcasters and Internet radio and television Media Providers, as well as a variety of other media content providers, such as providers of video on screens in laundromats, gas pumps and other public places. The media content providers here are meant to represent any and all ways that media may be presented in public and private situations. The media broadcasters are not limited to conventional airways broadcasters, but may include network video providers, such as streaming by cable or satellite as well. Broadcasters 107, 113 and 114 are meant to represent essentially any media content provider. The description as affiliated simply means that a provider has registered with a service of the present invention for Query and Response services, and is therefore affiliated.

Broadcaster (Media Provider) 107 is illustrated as comprising an Internet-connected Server 108 having access to a coupled data repository 109, a connected computerized appliance 110 for input and configuration purposes, and broadcast elements 111, providing broadcast by virtue of antenna tower 112. Media providers b through n may be regarded as having equipment the same as, or providing the same purposes, as shown for provider 107. The Servers depicted in each of the Media Providers are connected to Internet backbone 102. The skilled person will understand that equipment and connection may differ for cable and satellite providers.

In the system illustrated by FIG. 1 each Media Provider a through n has a hosted internet webpage provided by a Server connected to Internet backbone 102. Each of Servers 122, 123, and 124 represents a hosted Web presence for one of the illustrated Media Providers. Web presence 122 may, for example, be hosted by affiliated Media Provider a (107), Web presence 123 may be hosted by affiliated Media Provider b (113), and Web presence 124 may be hosted by affiliated Media Provider n (114). Each Media Provider a through n may be considered to have an audience, which may be a large number of people who are individual consumers of material provided by Media Providers a through n. Individual members of the audiences may listen to radio stations (as Media Providers) through a radio of any one of many sorts, watch and listen to television broadcasts, and may consume media material provided by such as cable, satellite and Internet broadcasts.

Audience members may connect to the Internet as illustrated, such as through a general-purpose computer 115, which may be a laptop computer, through an Internet Service Provider (ISP) 117, through a tablet device via a WiFi network 118 for example, or by a Smartphone 119 operating through a Cell system 120. Devices 115, 116 and 119 are exemplary, and meant to illustrate all of the sorts of devices that audience members may use to consume media content, and through which audience members may connect through a network to respond to a Query. In some cases the audience members may consume media content using the same devices illustrated through which they connect to the Internet, or in a different way using different electronic devices. Such devices may include, for example, TV apparatus, tablet devices and wearable apparatus capable of network connection.

Media Providers a through n generally desire to attract a large audience for their media content provided. At the same time they desire to attract audiences to their hosted websites. An object of the present invention is to provide services to Media Providers that will convert media audiences to users of their hosted websites.

In one embodiment of the invention Media Providers a through n may become registered Affiliates of Query/Response Service 103 to avail themselves of services there provided. In following examples it may be assumed that all of the Media Providers depicted in FIG. 1 are registered Affiliates with Service 103.

Figure 2:
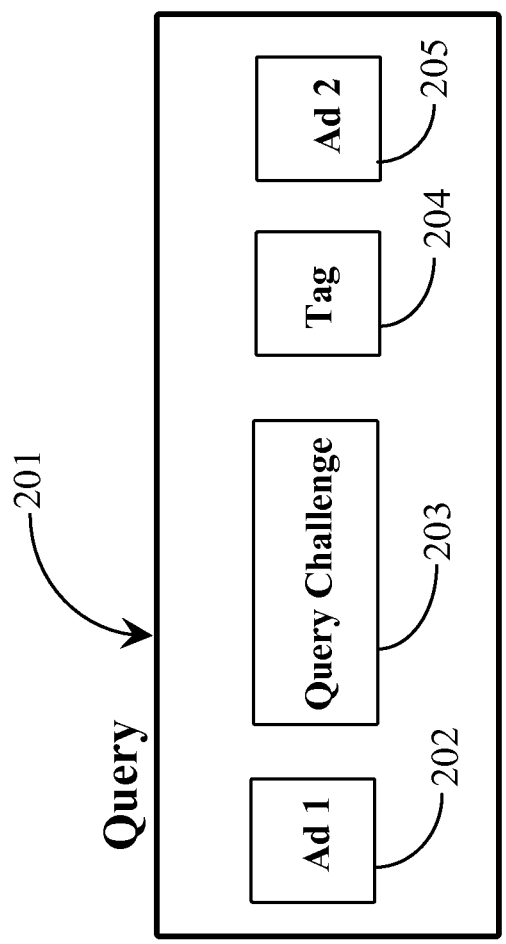
FIG. 2 is an illustrating of a Query in an embodiment of the invention.

In one embodiment of the invention Service 103 provides regularly a Query to each affiliated Media Provider, to be played at various times in the Media Provider's program schedule. FIG. 2 is an illustration representing one such Query 201. A Query provided to an Affiliate will typically be an audio file, such as an MP3 file (for a radio broadcaster), or a video file (for a TV broadcaster, for example), such as an .avi file. The Query may be provided once per day, several times per day, once per week, or at any other period as agreed between the Query/Response Service and the Affiliate.

A Query may have associated parts. In this embodiment a leading advertisement Ad 1 (202) starts the Query, and a Query Challenge follows the advertisement. The Query Challenge states the content of the Query, such as, for example: "Do you believe the SF Giants can repeat as World Series Champions in 2015?". The Query Challenge is followed by Tag 204, which directs an audience member where to respond to the Query. The destination for response will typically be the URL of the website hosted by the Media Provider Affiliate of the Query/Response Service. A final piece in this example is an ending advertisement 205, labeled Ad 2.

In an embodiment of the invention the Query 201 is provided through Internet 101 to an Affiliate Media Provider, such as Provider 107, at an agreed-to time and on an agreed-to period, to Server 108 at the Media Provider's broadcast head-end. The Query may then be stored, accessed and inserted in the Provider's broadcast schedule, which may be done by knowledge workers through general-purpose computer 110, or in another manner. The Query then becomes a repeating part of the Media Provider's streaming or broadcasting content 111.

The skilled person will understand that one or two advertisements are not limiting in the invention. There may be no Ads or more than the two depicted in FIG. 2. The Query Challenge can be just about any question or challenge agreed to by the Service and the Affiliate. The Tag may in some cases be interactive, such as for a person following a media presentation in video on a device having Internet-connectivity.

Figure 3:
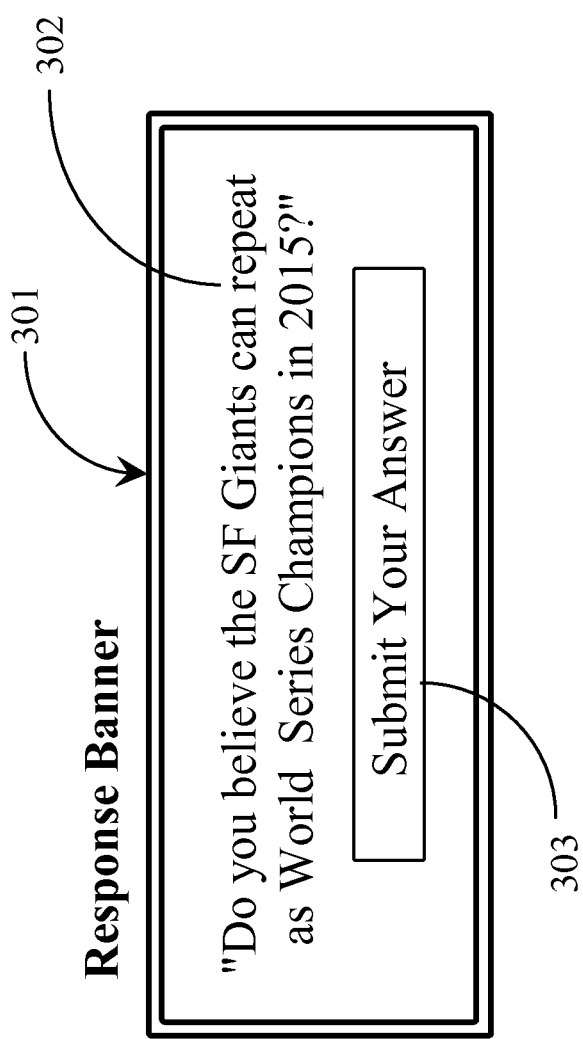
FIG. 3 is an illustration of a Banner in an embodiment of the invention.

FIG. 3 illustrates a Banner 301 provided to a website hosted by an affiliated Media Provider, the Banner associated one-to-one with a Query sent to the same Media Provider. Banner 301 in one embodiment is an HTML file that may be inserted into the code of a page of the website of the Media Provider. This insertion in one embodiment may be done manually, or in another embodiment code may be provided by the affiliated Media Provider such that an executable file may be sent, including the HTML Banner file, and the insertion may be done substantially automatically by executing the code attendant to the Banner HTML file.

In FIG. 3 the Query "Do you believe the SF Giants can repeat as World Series Champions in 2015?" is repeated in the Banner to be displayed in the webpage, and a Link (i.e. radio button) 303 is provided to be selected by an audience member to submit an answer. In practice, a member of an audience of a Media Provider, who may hear the Query in a radio or TV broadcast, or in an Internet, cable or Satellite-provided program, navigates using an Internet-capable appliance to the webpage using the URL to participate by responding to the Query.

A skilled person will understand that the Banner itself may be made as a link, and there would be no need for the radio button. The link activity for the Banner may be implemented in other ways as well.

In some embodiments Queries and associated Banners may be annotated with one or more logos or icons that may be implemented to provide brand recognition. Other annotations and decorations may be implemented as well, and in some embodiment animation may be used in one or both of Queries and Banners to enhance the experience for audience members participating.

Referring back to FIG. 1, Audience members may access the Media Provider's webpage or other Internet destination using any one of devices 115, 116 or 119, or any other network-capable device connecting to the Internet. In some circumstances the Audience member may have been consuming the broadcast content of the Media Provider using the same Internet-capable device that he or she will use to connect to the Media-Provider's website. In the case of TV or video presentation, the Query may be an interactive link that the audience member may select to go to the website.

In addition to browser access, wherein an Audience member may connect to Server 104 and may then participate through interactive pages provided by the Server, in some implementations a device, such as a cellular telephone 119, for example, may execute a local application providing interactivity with Server 104. Such an application may be provided by the service of the invention in any one of a variety of ways. An application of this sort may provide faster response than the browser version, and a further range of activity that may not be available in the browser version, such as including GPS location, image capture and inclusion in interactivity and the like.

In yet another circumstance, a local application may be provided in real time from the Server side by middleware that would operate as a part of SW 106.

When an audience member selects the link to respond to the Query repeated in the Banner, the audience member is re-directed in one embodiment to Server 104 in Query/Response Service 103, the Server executing SW 106. Server 104 executing SW 106 provides an interactive graphical user interface to the Audience member enabling the Audience member to reply to the Query, and in some embodiments to enter other information as well.

Figure 4:
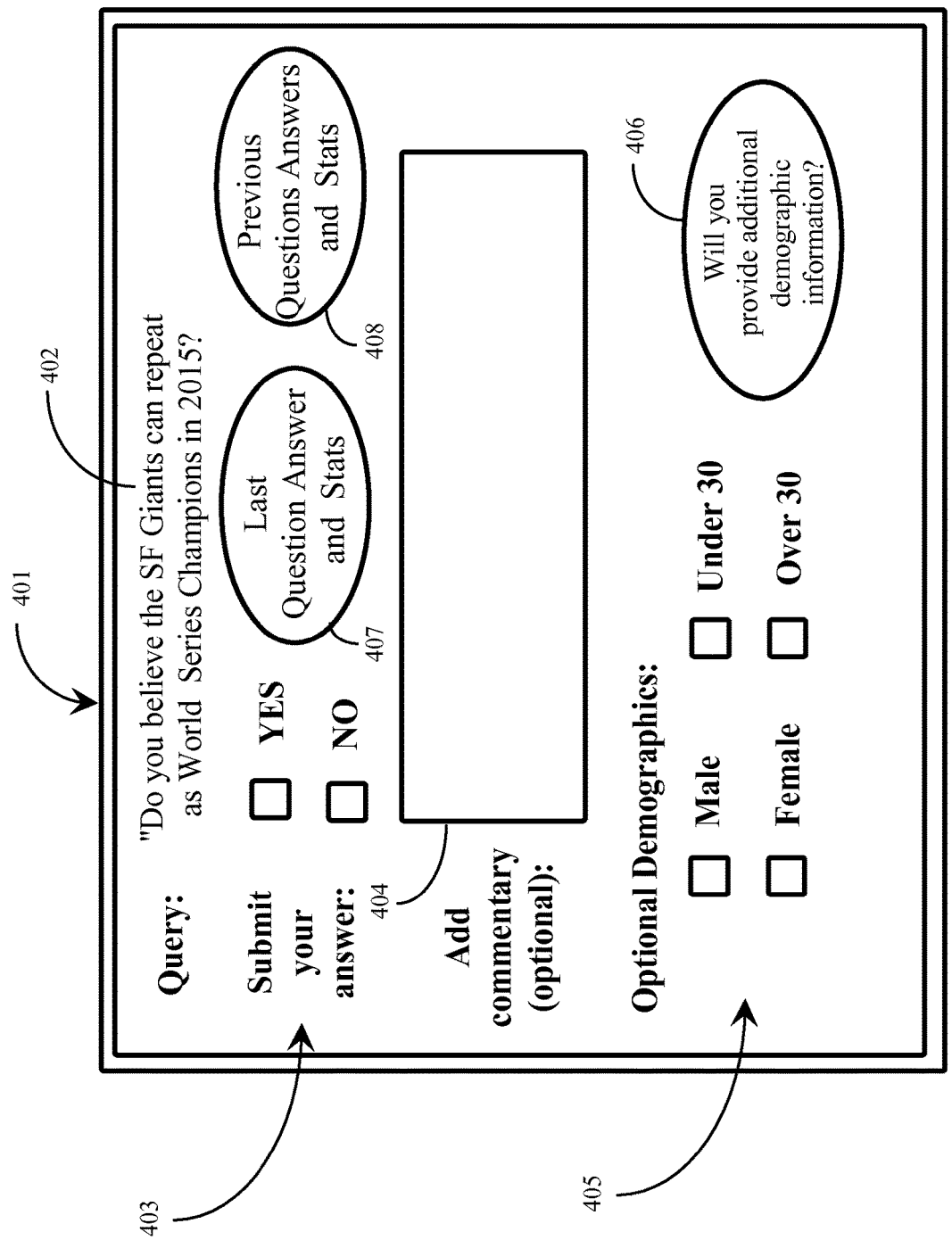
FIG. 4 is an example of an interactive interface in an embodiment of the invention.

FIG. 4 is an example of an Interactive Interface 401 provided to the audience member in response to that member executing the Link in FIG. 3 and being redirected to Server 104. In this example the current Query is repeated at 402 for the member's benefit, and Yes and No check boxes are provided for the member to record a minimum answer to the Query. The skilled person will understand that this format is useful for those queries that may be answered with a simple Yes or No, and that more sophisticated interfaces are required for Queries that require more sophisticated responses, or opinions.

In this example an Interactive Link 407 is provided enabling the audience member to see the last Query that was provided, and answers and statistics related to the last Query. The member is redirected in this instance to another interactive interface organized for the purpose. Similarly an Interactive Link 408 is provided enabling the member to review previous Queries and answers and stats relating to those previous queries. This will in most embodiments be limited to a specific time frame.

An entry field 404 is provided for the audience member to optionally enter additional commentary of rationale regarding the question. A member may wish, for example, to indicate why he or she answered the way they did. Also, optionally at 405, the member may be asked for additional demographic information such as gender and age group. In some embodiments there may be a Link 406 redirecting members to other interactive interfaces to expand on opinions and demographics, should some members wish to do so. Other links may be provided along with suggestions and instructions to enable a member to provide further information and comments.

In embodiments of the invention Server 104 executing SW 106 maintains a database in data repository 105. There exists a configuration facility accessible by an authorized person to record Queries associated with Affiliates and times at which Queries are to be provided, and SW 106 operates to store answers, comments and demographics made by audience members visiting the interactive interfaces provided by Server 104. In SW 106 algorithms are operable to determine statistics regarding each Query and all answers and other information submitted in response to Queries presented in Affiliate programming.

It will be apparent to the skilled person that the simple baseball genre Query used as an example in FIGS. 3 and 4 is but one example of a great variety of Queries that may be prepared, associated with Affiliates, and provided to the Affiliates for inclusion in their programming.

Figure 5:
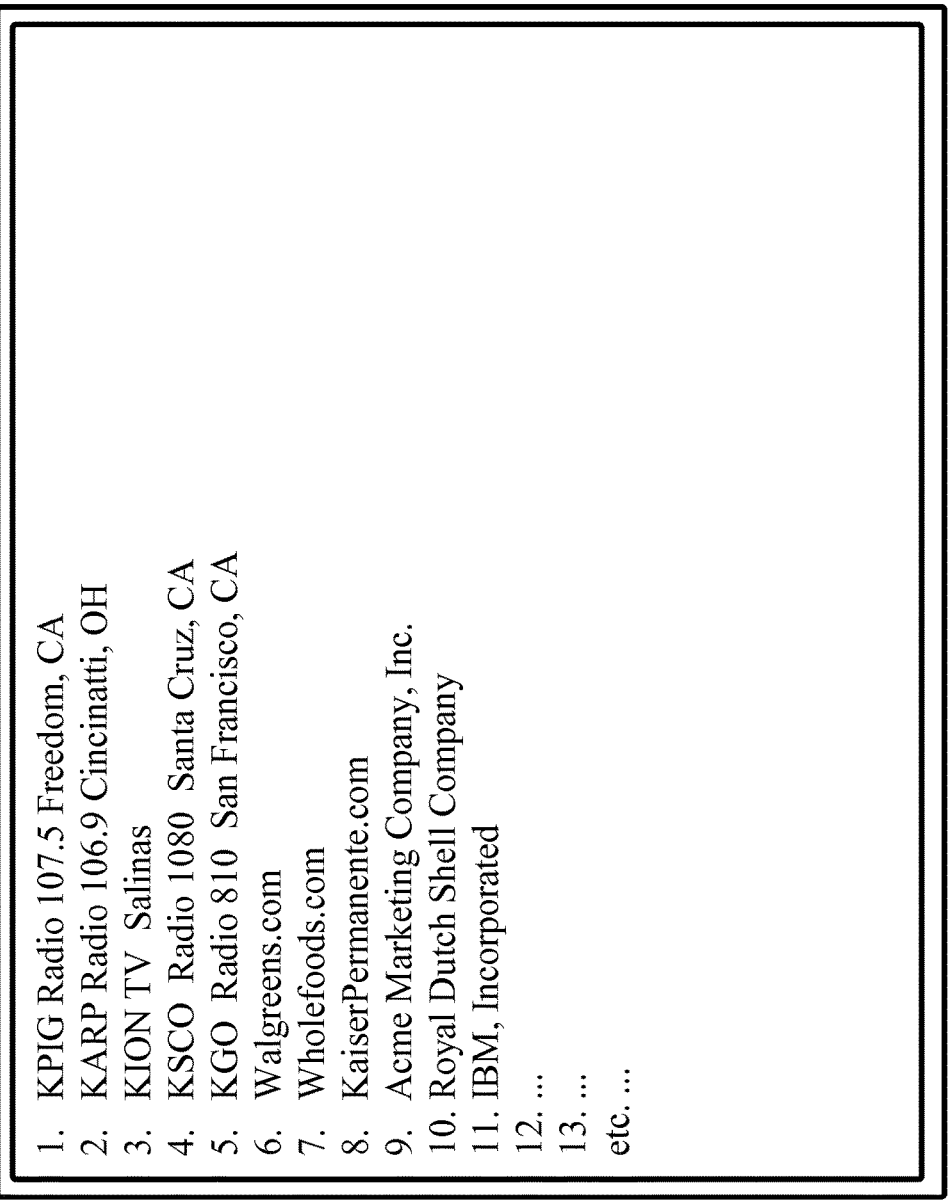
FIG. 5 is an example of a listing of Media Providers in an embodiment of the invention.

FIG. 5 is an example of a listing of affiliated Media Providers and some information regarding the Affiliates at Query/Response Service 103 (FIG. 1). Affiliates may be acquired in any one of several ways, and there is a configuration facility for registering an Affiliate and entering required and optional information about each Affiliate. Each Affiliate has opportunity to specify and select Queries and to set the times and frequencies of presentation of Queries in each Affiliates broadcast schedule.

FIG. 5 is exemplary only, and shows four radio stations and one TV station, plus a number of other enterprises as Affiliates who are also Media Providers that have opted to take advantage of the Query/Response system in an embodiment of the invention. Walgreens, WholeFoods and Kaiser Permanante are shown to represent businesses that may provide media presentations in, for example, an Internet web setting, and in other ways as well. For example, Walgreens may provide video presentations for customers and/or employees in Walgreen drugstore branches. Acme marketing may be a business that provides ready to use videos for a variety of different other businesses in a business-to-business situation. Royal Dutch Shell may provide videos on screens of gas pumps in service stations. There are many possibilities.

The Affiliate list shown in FIG. 5 may be interactive such that selecting an Affiliate in the list will open an agreement that exists between the Service and the Affiliate, and may also present preferences, Query selection and schedules for providing to the Affiliate. Initiating the link may also bring up an Affiliate profile with substantial information regarding the Affiliate.

As was mentioned previously, Queries may be prepared in a wide variety of formats and genre. Political polls may be conducted, other sorts of polls may be conducted, such as commercial preferences to indicate efficacy of advertisements, movies and plays may be reviewed by Query, and Queries may follow any of a great variety of subject matters. Affiliates may select from specific Queries, and indicate preference by genre (sports, religion, etiquette, politics, pop culture, conspiracy, medical, financial food chain, home repair, and more . . . ). An object is to provide Queries that are topical and of great interest to audiences of the broadcast Affiliate, which topics may include topics related to current news stories, political contests, music and art and the like, in the geographical area of the Affiliate, and in the genre related to the main focus of the broadcast Affiliate. A good choice of Query will translate to a significant rise in traffic to the Affiliate's website. In many embodiments the profile of an Affiliate will be used to select and/or create Queries with subject matter specific to the nature of the Affiliate as a broadcaster, and geographical relevancy of subject material.

In some embodiments, such as, for example, straw polls, political polls and other sorts of polls conducted by Queries, the results of such Query responses, and data regarding responses may be marketed to commercial entities and others who may have need for the information. Query results and data from Queries concerning audience opinions and preferences in many areas may be marketed to commercial entities that provide products and services.

In one embodiment of the invention, upon an audience member connecting to Server 104 using a computerized, Internet-capable device, an application on the device will provide certain information to the Query/Response service at Server 104, such as the geographic location of the device at the time of connection. The location information may be used, for example, to track how many audience members may respond to a Query broadcast by an Affiliate from specific geographic areas, and to track responses by how remote the Internet-connected devices may be from the broadcast origin. An audience member may digest broadcast information online, for example, from an Affiliate in San Diego, Calif., and the audience member may be in France. Information as to the attraction of the broadcast and/or the Query to the person in France, or in some other remote area from the broadcast origin may be important to the Affiliate, and data may be tracked and provided by the service.

Referring back to FIG. 1 advertising Entities 121, shown connected to Internet backbone 102 may provide advertisements that may be coordinated with Queries and Banners in embodiments of the invention. Advertisers may become Affiliates of the service, and configuration may be done to algorithms and methods for selecting advertisements to be applied to Queries and Banners or adjacent the Queries and Banners. In the case of audio broadcast mediums, such as conventional radio stations, the advertisements will be audio files that may be concatenated with Query files before the total file is presented to a broadcaster. In the case of TV and Video streaming Affiliates the advertisements may be video clips which may be concatenated with the Query clips before, during or after broadcast by the Affiliates.

In selection of advertisements, profiles and preferences may be taken into account, such as honoring a preference of Ad placement avoiding Ad placement, for pharmaceuticals for example. Also audience genre preferences, geography and many other criteria may be considered in the provision of advertisements and associating the advertisements with Queries and Banners.

Figure 6:
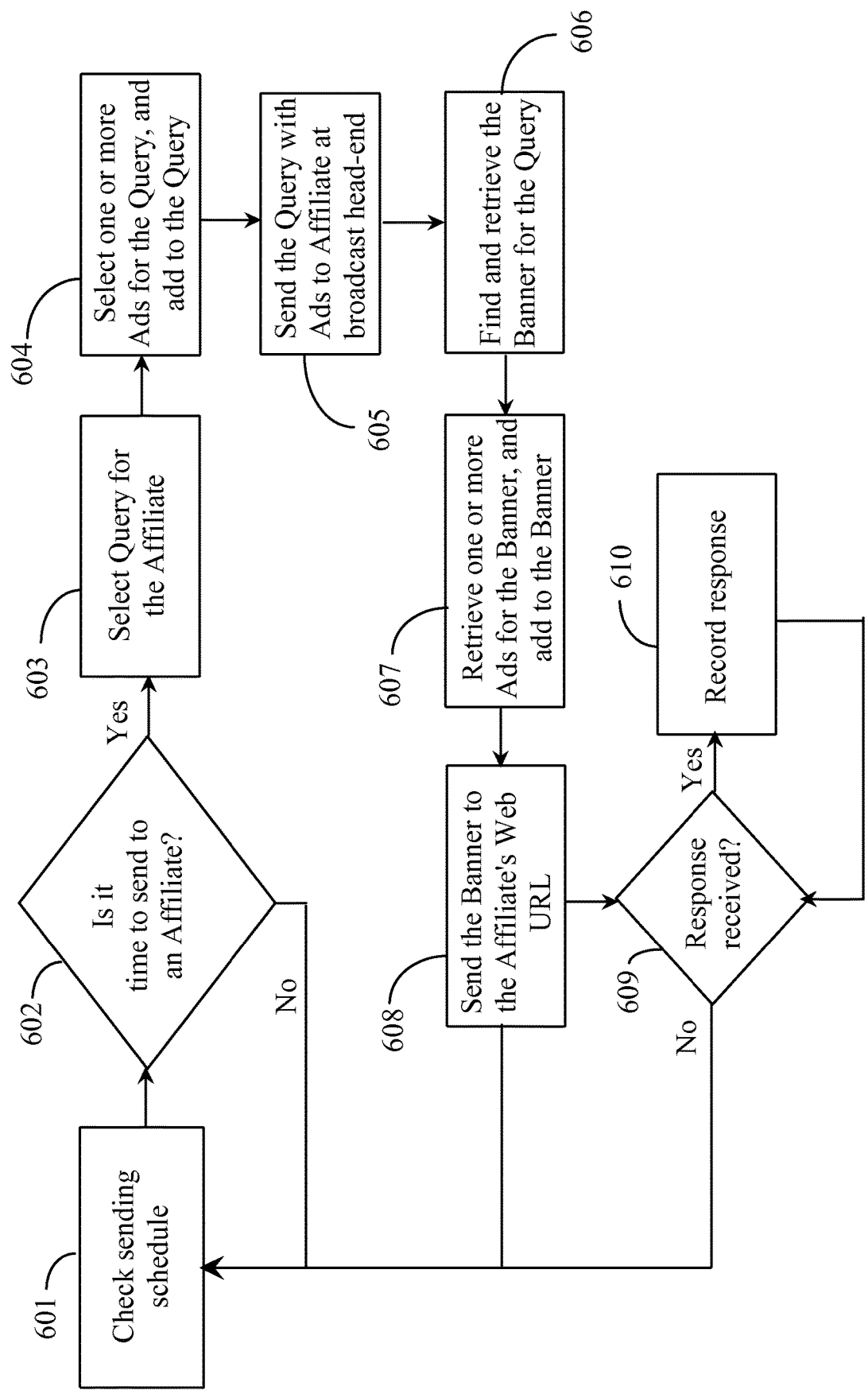
FIG. 6 is a flow chart illustrating steps in practicing the invention in one embodiment.

FIG. 6 is a flow chart illustrating action flow in one embodiment of the invention. Assuming that there is a plurality of Affiliates, and Queries and Banners have been prepared and stored associated with the Affiliates, a sending schedule is assumed as well. At step 601 the System checks the sending schedule. At step 602, if a "send" action is discovered control proceeds to step 603, where the system selects a Query for that Affiliate. If no send action is discovered, control reverts to step 601 to recheck the schedule. At step 604, one or more Ads are optionally retrieved and added to the Query. At step 605 the Query with optional Ads is sent to the broadcast head-end for the Affiliate.

At step 606 the system, having just sent the Query to the Affiliate, finds and retrieves a Banner for the Query. In some cases these steps may be done in parallel. At step 607 Ads are optionally added to the Banner, and at step 608 the Banner is sent to the Affiliate's website at the recorded URL. Control reverts to step 601 to continue to check the send schedule, but the system now also looks for responses received at step 609. When responses are received, they are associated with the correct Banner, Query and Affiliate, and the responses are recorded to be used later in data mining and marketing.

The skilled person will understand that the embodiments described above are entirely exemplary, and that details of operation and structure may differ considerably, but may still be considered to be within the scope of the present invention. The design and look of interactive interfaces, the presentation of advertisements, and the like may be done in a wide variety of ways. The scope of the invention is only limited by the specific limitations of the claims below.

The invention claimed is:

1. A Query/Response system, comprising:
one or more Internet-connected computerized Servers at a Service provider site executing software (SW) from a non-transitory medium;
a data repository coupled to the one or more Internet-connected Servers;
a computerized device operated by an audience member enabled to connect to and receive an application provided by the SW from the Service provider site;
information concerning a plurality of Media Provider entities providing streaming media programming to audience members including audio radio broadcast, the information including a first Internet destination address providing the streaming and for delivery of digital information to each Media provider and a second Internet destination address for a web site associated with and hosted by each media provider;
a first facility provided by the SW creating Queries and Banners as HTML files enabled to display the Queries as media via the application during the broadcast, and associating each one of the created Queries and Banners with one of the Media Providers providing an audio radio broadcast, each Query presenting a challenge as a question, the Banner also including a Tag indicating the second destination for the Media providers web site enabling an audience member to respond to the Query challenge via the application received from the SW in real time with the broadcast and resident on the computerized device, the banner requiring the audience member to interact with the Query to answer via direct interaction with an interactive link configured to redirect the audience member activating the link to the one or more Internet-connected Servers at the Service site at the second Internet destination address; and
a second facility provided by the SW connecting each audience member activating the links to an interactive interface at the second Internet destination address specifically designed and configured to accept Query responses for the banner the audience member interacted with;
wherein Queries and associated Banners are selected at least based upon a geographic location of the computerized device and are inserted into the streaming media programming and interaction by the audience member with the Banner causes navigation to the associated interactive interface of the Media providers web site, and responses are accepted from the audience member at the interactive interface, thereby increasing traffic to the web site of the Media provider at the second Internet destination address.

2. The Query/Response system of claim 1 wherein an advertisement is included in the Query before or after the Query challenge.

3. The Query/Response system of claim 2 wherein advertisements are drawn from Internet-connected sources, and are selected according to Affiliate's profile information, including preferences.

4. The Query/Response system of claim 2 wherein advertisements are selected considering known information regarding audience demographics and geographic location of the computerized device.

5. The Query/Response system of claim 2 wherein a leading and a trailing advertisement are presented in the Query.

6. The Query/Response system of claim 2 wherein one or more advertisements are also presented in the Banner sent to the Affiliate's website.

7. The Query/Response system of claim 1 wherein Audience responses received are recorded in the data repository associated with Queries, Banners and Media providers.

8. The Query/Response system of claim 7 wherein responses to Queries are tallied for periods between sending the Queries, and the system makes Responses available to interested parties.

9. The Query/Response system of claim 1 wherein the interactive interfaces in the third facility promotes information from Audience members in addition to a response to the query.

10. The Query/Response system of claim 9 wherein the information additional to the Query response from Audience members includes one or both of demographic and geographic information, and the information is used by the system to further process responses for interested parties.

11. A Query/Response method, comprising:
creating at a Server executing software at a Query/Response service, Queries as audio and video files, each Query presenting a challenge as a question including a tag including a first URL for an affiliated Media Provider's website where an audience member automatically navigates to and responds to the Query challenge via interaction with the Query;
associating the created Queries with individual ones of the affiliated Media Providers, the Media Providers broadcasting audio broadcast including the Query embedded within the broadcast to applications received from the software in real time with the broadcasting and installed on a computerized appliance operated by voluntary audience members accessing the audio broadcasts from a second URL;
creating a Banner associated with and displaying each Query, the Banners being HTML files presenting the Query Challenge and also exhibiting a link to the Query/Response Server at the second URL;
periodically sending created Queries to the affiliated Media Providers, and sending the Banners associated with the Queries to the first URL of the Affiliate's website, where the Banners are inserted in an interactive interface at the Media providers website based at least upon a geographic location of the computerized device of the audience member utilized to access the audio and video broadcast;
connecting Audience members activating the link in the Banners to the interactive interface at the Media providers web site, enabling the Audience members to answer the challenge in the Query and Banner; and
increasing traffic at the Media Providers Website via the audience members interaction with the Banner and recording the responses from Audience members in the data repository.

12. The Query/Response method of claim 11 wherein an advertisement is included in the Query before or after the Query challenge.

13. The Query/Response method of claim 12 wherein advertisements are drawn from Internet-connected sources, and are selected according to Affiliate's profile information, including preferences.

14. The Query/Response method of claim 12 wherein advertisements are selected considering known information regarding audience demographics and geographic location of the computerized device.

15. The Query/Response method of claim 2 wherein a leading and a trailing advertisement are presented in the Query.

16. The Query/Response method of claim 12 wherein one or more advertisements are also presented in the Banner sent to the Affiliate's website.

17. The Query/Response method of claim 11 wherein Audience responses received are recorded in the data repository associated with Queries, Banners and Affiliates.

18. The Query/Response method of claim 17 wherein responses to Queries are tallied for periods between sending the Queries, and the system makes results of responses available to interested parties.

19. The Query/Response method of claim 11 wherein the interactive interfaces in the third facility markets information from responders in addition to a response to the Query.

20. The Query/Response method of claim 19 wherein the information additional to the Query response from responders includes one or both of demographic and geographic information, and the information is used by the system to further process responses for marketing to interested parties.

\* \* \* \* \*